United States Patent [19]

Gardner

[11] Patent Number: 5,427,022

[45] Date of Patent: Jun. 27, 1995

[54] APPARATUS FOR AXIAL COMPRESSION OF TIRES HAVING ALIGNING MEMBER

[75] Inventor: Donald M. Gardner, Yale, Mich.

[73] Assignee: American Tire Reclamation, Inc., Detroit, Mich.

[21] Appl. No.: 967,264

[22] Filed: Oct. 27, 1992

[51] Int. Cl.⁶ .............................................. B30B 1/32
[52] U.S. Cl. ................................ 100/214; 100/12; 100/269 R; 201/25
[58] Field of Search ................ 100/12, 100, 214, 232, 100/269 R, 295

[56] References Cited

U.S. PATENT DOCUMENTS

| | | |
|---|---|---|
| T965,002 | 12/1977 | Crane et al. |
| 1,616,838 | 2/1927 | Wright et al. .............. 100/269 R X |
| 2,719,135 | 9/1955 | Wood . |
| 2,921,423 | 1/1960 | Cover et al. ..................... 100/12 X |
| 3,352,228 | 11/1967 | Hill ........................................ 100/12 |
| 3,404,019 | 10/1968 | Gotshall . |
| 3,404,120 | 10/1968 | Gotshall . |
| 3,493,532 | 2/1970 | Gotshall . |
| 3,582,279 | 6/1971 | Beckman et al. . |
| 3,615,754 | 10/1971 | Gotshall . |
| 3,640,940 | 2/1972 | Gotshall . |
| 3,642,512 | 2/1972 | Gotshall . |
| 3,644,131 | 2/1972 | Gotshall . |
| 3,699,216 | 10/1972 | Gotshall . |
| 3,704,276 | 11/1972 | Gotshall . |
| 3,822,526 | 7/1974 | Black ............................. 100/295 X |
| 3,823,224 | 7/1974 | Laman et al. . |
| 3,875,077 | 4/1975 | Sanga . |
| 3,966,487 | 6/1976 | Crane et al. . |
| 3,978,199 | 8/1976 | Maruhnic et al. . |
| 3,996,022 | 12/1976 | Larsen . |
| 4,002,587 | 1/1977 | Watanabe et al. . |
| 4,038,100 | 7/1977 | Haberman . |
| 4,082,694 | 4/1978 | Wennerberg et al. . |
| 4,221,608 | 9/1980 | Beckman . |
| 4,250,158 | 2/1981 | Solbakken et al. . |
| 4,284,616 | 8/1981 | Solbakken et al. . |
| 4,412,889 | 11/1983 | Oeck . |
| 5,037,628 | 8/1991 | Fader . |
| 5,121,680 | 6/1992 | Nordberg ........................... 100/12 |

FOREIGN PATENT DOCUMENTS 1091151 11/1967 United Kingdom ................ 100/12

OTHER PUBLICATIONS

Wolfson, David E.; Destructive Distillation of Scrap Tires; U.S. Dept. of the Interior (1969), Bureau of Mines No. 7302, TN23.U7 No. 7302 622.06173.

Scrap Tires: A Resource and Technology Evaluation of Tire Pyrolysis and Other Selected Alternate Technologies; Study founded by the Office of Industrial Programs of the U.S. Dept. of Energy; conducted by EG & G Idaho, Inc., with assistance from Science Applications, Inc. and Galaxy, Inc.

J. A. Beckman, et al.; Destructive Distillation, Publication No. EM 74–225.

Primary Examiner—Stephen F. Gerrity
Attorney, Agent, or Firm—Harness, Dickey & Pierce

[57] ABSTRACT

An apparatus for batch compression of tires has a support frame for supporting and aligning a plurality of tires in a generally axially aligned position. A mechanism for securing the plurality of tires is provided, as well as a ram member for axially compressing the tires which includes a protrusion for engaging a central orifice of each of the tires for guarding against misalignment of the tires. Also set forth is a method for batch pyrolysis of tires comprising the steps of first baling a plurality of tires together in a compressed cylinder having an orifice extending through the central portion. Next, the compressed cylinder is placed in a pyrolysis oven such that the heat can circulate through the central orifice and about the compressed cylinder. Thereafter, the material is batch pyrolyzed to produce useful by-products and retain a greater portion of the char material. An article of manufacture is also provided wherein a plurality of tires are baled together such that the central orifice of the tires remain open for increasing the surface area by which a pyrolysis process can operate to decompose the tires.

4 Claims, 5 Drawing Sheets

APPARATUS FOR AXIAL COMPRESSION OF TIRES HAVING ALIGNING MEMBER

BACKGROUND OF THE INVENTION

Thee present invention relates to an improved process and article of manufacture for improved batch processing of tires during pyrolysis.

Disposal of the increasingly large number of tires used each year has become a critical problem in the waste disposal field today. If the organic constituents of a tire can be released in a cost effective manner through pyrolysis, the number of tires which have been stored in landfills and the like could be a viable source of energy and raw by-products. While many pyrolysis processes have been tried in various forms, there remains a need today for improved processes which would be cost effective such that tires can be decomposed by pyrolysis and the by-products sold for a profit.

There are generally two types of destructive distillation or pyrolysis procedures used today for pyrolyzing of waste materials. The first type of process is a continuous type process which is utilized to continually move pyrolysis material through a pyrolysis oven. This process utilizes a "cork screw" the arrangement or the like for moving the materials through the oven which provides for progressive decomposition of the shredded tire parts. The second the of process is a batch type process where a single material is placed in an oven and pyrolized until the material is completely broken down into its component pyrolysis products. In the past, both of these processes have relied on reducing the initial size of tires. Thus, shredding or otherwise grinding the tire material into smaller pieces was required for best results.

As will be readily realized to those skilled in the art, the shredding of tires is an extremely energy intensive type step which greatly reduces the cost effectiveness of the pyrolysis process. Such a step is required in the continuous type processes, because it is necessary to have proper size particles to run through the "cork screw" feeder. Even in the batch type processes reduction of feed stock size is normally necessary in that the smaller sized material allows for larger surface area of the feed stock and allows penetration of the heat at a more rapid rate thereby increasing the effectiveness of the pyrolysis process. There have been attempts to use a batch type process with a larger square bale or the like. However, these attempts were found ineffective in that the heat did not penetrate the center of the large cubical bails and therefore was found to be inefficient. Also, while the continuous process seems to be efficient in time used during processing of the material, because the pyrolysis bed is continually agitated a high percentage of the char materials go into the vapor stream thereby polluting the resulting useful by-products with desireable char. This method also results in a net reduction of available char which can be recycled or turned into valuable byproducts such as set forth in U.S. Pat. No. 5,037,628, Issue Date Aug. 6, 1991, entitled "Method For Reclaiming Carbonaceous Material From A Waste Material".

Thus, it is a goal in the present invention to provide an energy efficient method of processing of tires which will allow batch pyrolysis of tires, on a cost effective basis, resulting in improved char recovery and purer useable by-products.

SUMMARY OF THE INVENTION

In accordance with the present invention there is provided an apparatus for batch compression of tires which includes a means for supporting and aligning a plurality of tires in a generally axially aligned position. A means for securing the plurality of tires is provided. Further provided is a means for axially compressing the tires which includes a protrusion for engaging a central orifice of each of the tires for guarding against misalignment of the tires.

In accordance with the method aspects of the present invention there is provided a method for batch pyrolysis of tires comprising the steps of first baling a plurality of tires together in a compressed cylinder having an orifice extending through the central portion. Next, the compressed cylinder is placed in a pyrolysis oven such that the heat can circulate through the central orifice and about the compressed cylinder. Thereafter, the material is batch pyrolized to produce useful by-products and retain a greater portion of the char material. In accordance with the product aspects of the present invention an article of manufacture is provided wherein a plurality of tires are baled together such that the central orifice of the tires remain open for increasing the surface area by which a pyrolysis process can operate to decompose the tires.

It is an object of the present invention to provide a cost effective method for reduction in size of row tires for improved recycling via pyrolysis.

It is still further an object of the present invention to provide a batch pyrolysis of tires without costly shreading of tires.

It is a further object of the present invention to provide a batch pyrolysis of tires which is simple to accomplish and provides improved char by-products and improved quality distillation by-product.

Additional objectives, advantages and features of the present invention will become apparent from the following description in the appended claims taken in conjunction with the accompanying drawings.

DESCRIPTION OF THE PREFERRED EMBODIMENTS

Figure 1:
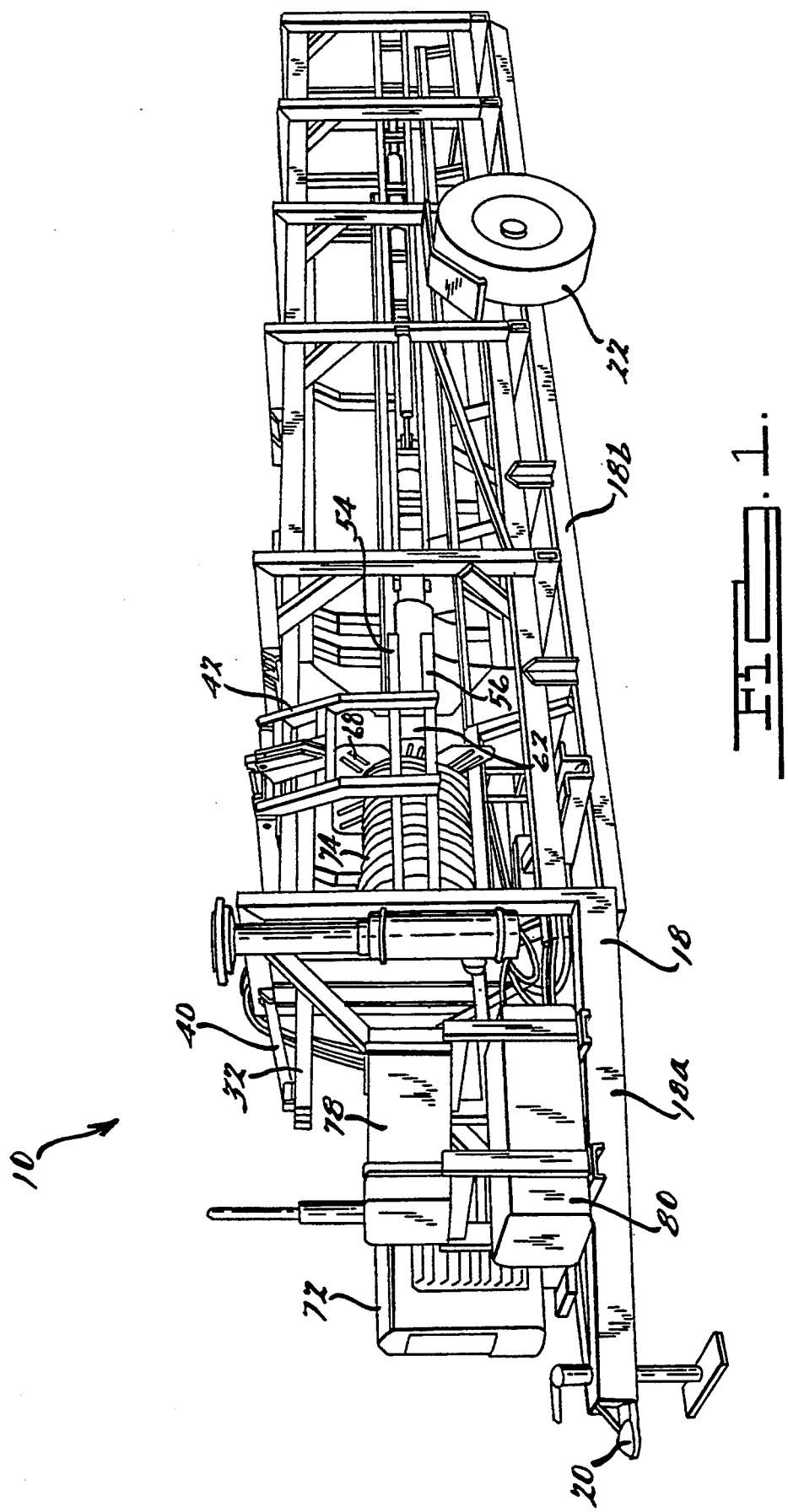
FIG. 1 is a perspective view of a tire baling apparatus produced in accordance with the present invention.
Figure 2:
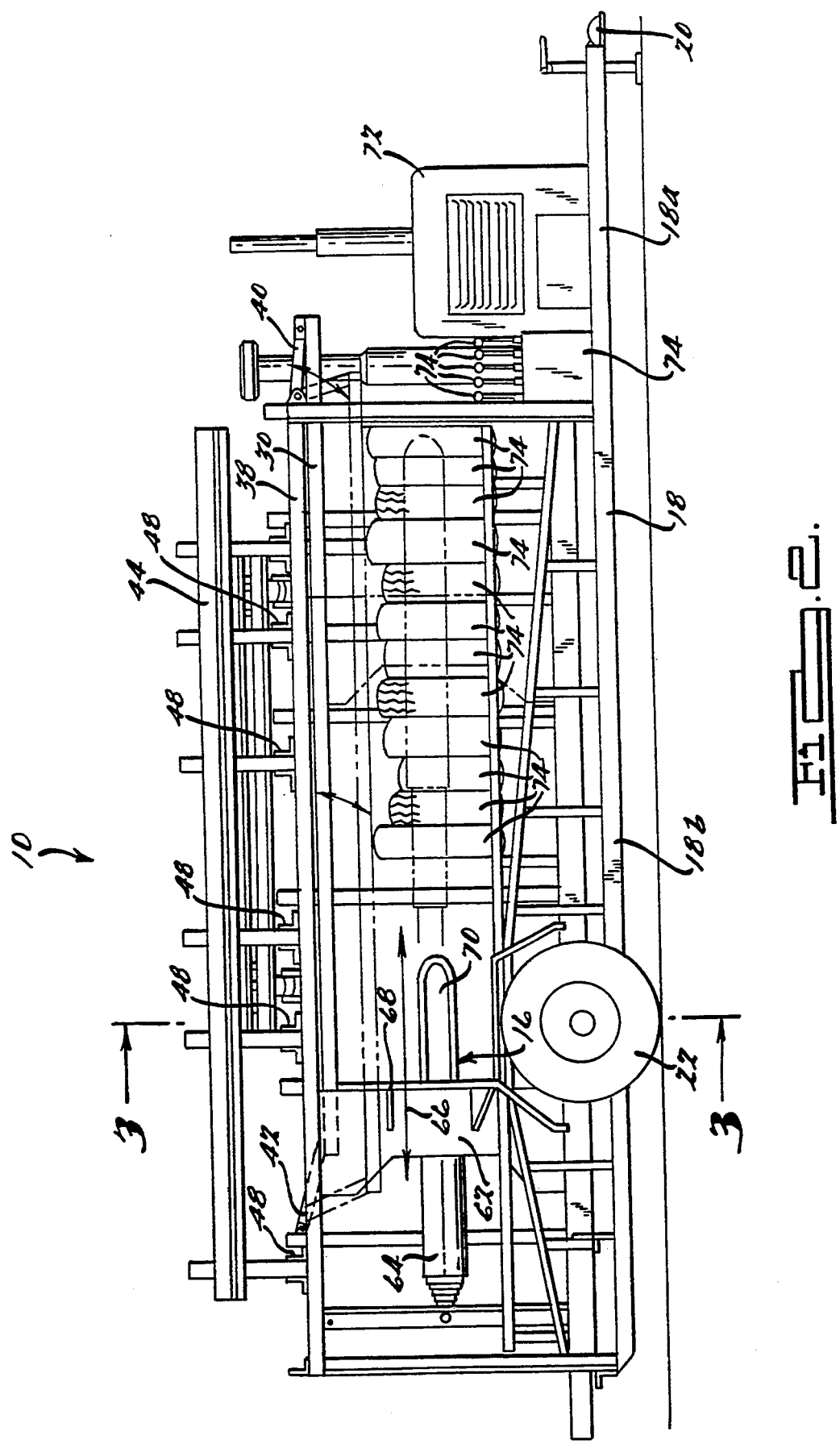
FIG. 2 is an elevation view of the tire baling apparatus produced in accordance with the present invention.
Figure 3:
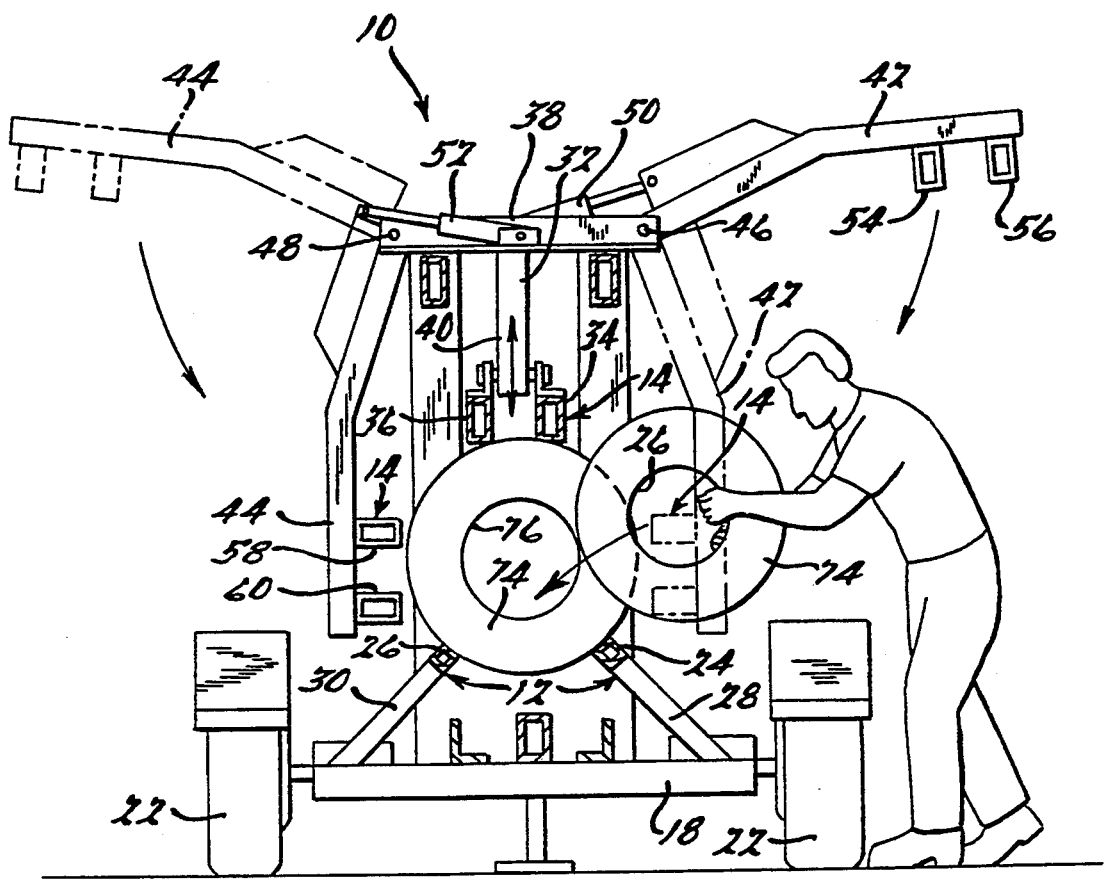
FIG. 3 is an end view showing the present invention illustrating loading and unloading of tires and raising the actuating arms of the bailer apparatus of the present invention.

Referring now to FIGS. 1, 2 and 3 there is shown an apparatus for batch compression for tires generally shown at 10. The apparatus 10 includes a means generally indicated at 12 for supporting and aligning a plurality of tires 15 in a generally axially aligned position. A means, generally indicated at 14, for securing the plurality of the tires 15 in the axially aligned position is also provided. Also included in the apparatus of the present invention is a means, generally indicated at 16, for axially compressing the tires 15 and which includes a protrusion for engaging a central orifice of each of the tires 15 in the plurality of tire 15 for guarding against disalignment of the tires.

In accordance with the preferred embodiment, the apparatus 10 is positioned on a trailer 18 which includes a hitch portion 20 and wheels 22. The trailer 18 includes a tongue portion 18a and a body portion 18b. The trailer 18 includes a pair of channel members 24 and 26 extend longitudinally along the length of the body portion 18b to provide a support for loading the tires 15 onto the apparatus 10. The channel members 24 and 26 are weldably secured by bar members 28 and 30. An upper tire engagement member 32 is provided which includes a pair of longitudinally extending bars 34 and 36. The extending bars 34 and 36 are attached to an upper frame member 38 via arms 40 and 42. Arms 40 and 42 are pivotally connected to the upper frame member 38 and form a parallelogram linkage by which the extending bars 34 and 36 may be raised or lowered by way of a hydraulic cylinder or the like. Side arm engagement members 43 and 44 are provided which are connected to the upper frame member 38 at pivot points 46 and 48, respectively. Hydraulic cylinders 50 and 52 are provided for raising and lowering the arms 43 and 44, respectively. Side arm engagement members 43 and 44 include channel members 54, 56, 58 and 60, two of which are attached to each member 43 or 44 which may be positioned adjacent the sides of the column of tires to prevent side to side movement of the column of tires.

Referring now to FIGS. 1 and 2, a ram member 62 is provided which may be actuated by cylinder 64 and travels in the direction of arrow 66. The ram member 62 includes a plate member 68 and has a male alignment protrusion 70 attached thereto.

The tongue portion 18a supports a diesel engine 72 which includes a hydraulic pump for supplying hydraulic actuating fluid. A hydraulic control board 74 is provided with various control levers 76 for controlling of the hydraulic functions of the apparatus 10 during operation. Of course, with any hydraulic system, a hydraulic reservoir 78 is provided a tank 80 provides fuel for the diesel engine 72.

Figure 4:
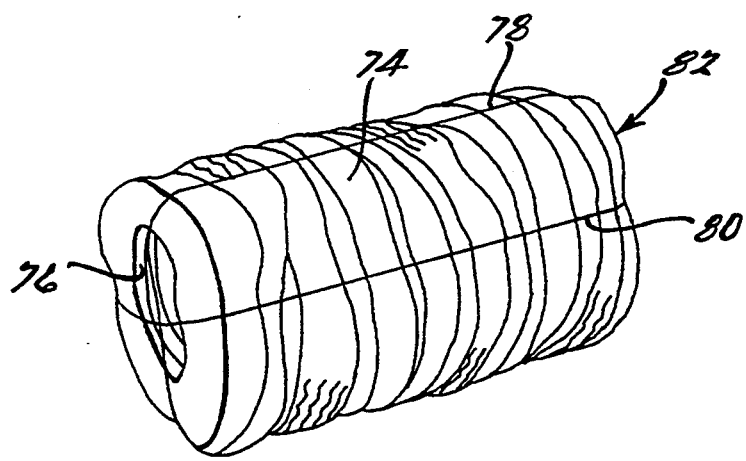
FIG. 4 is a perspective view of a bale of tires produced in accordance with the teachings of the present invention.
Figure 5:
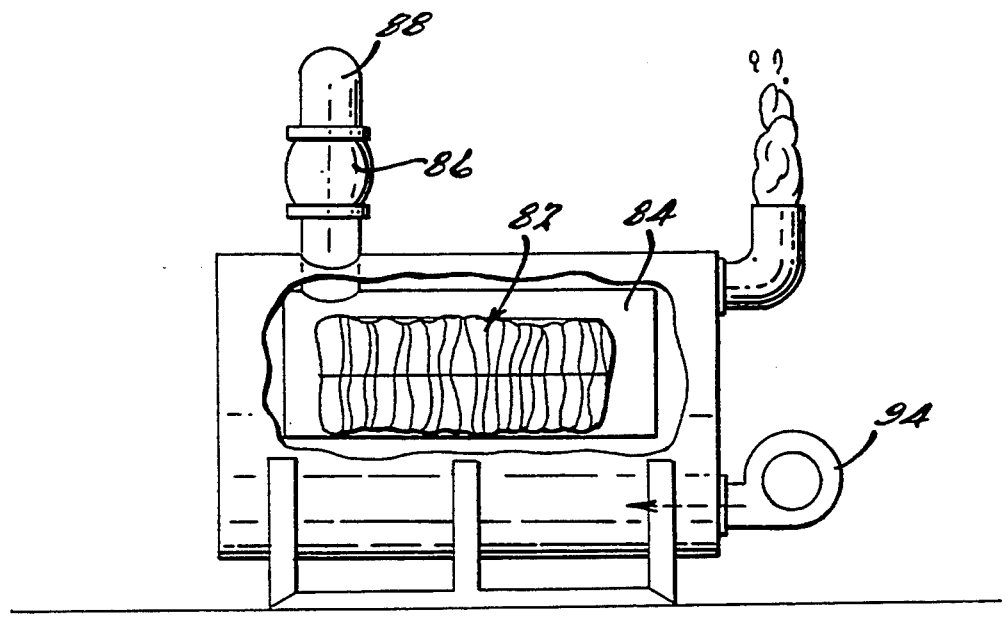
FIG. 5 is an elevational view partially in phantom showing the destructive distillation apparatus in accordance with the method of the present invention.

Thus, in operation with the side engagement members 43 and 44 in the upper position the tires 15 are manually loaded onto the channel membrane 24 and 26. The tires 15 are generally axially aligned such that the central opening 81 of the tires 15 are generally aligned. After the tires 15 are loaded onto the assembly, i.e. from about 22-50 tires, the arms 44 and 42 are placed in the down position, as shown in FIG. 3, and the upper extending bars 34 and 36 are also hydraulically actuated to the position shown in FIG. 3. Thereafter, the ram member 62 is actuated such that the male projection member 70 is thrust into the central opening 81 thereby aligning and keeping the tires 15 axially aligned during compression by the plate member 68 until the tires 15 are fully compressed as shown in FIG. 1. With the tires 15 fully compressed a pair of pre-sized baling wires 79 and 83 are slipped over the bale of tires to hold them in the compressed state. Thus, as shown in FIG. 4, a final bale of tires 82 is facilitated in a relatively small area with a central opening 81 aligned. This results in a reduced area for storage of the tires and also provides a bale which may be readily batch pyrolized as set forth below.

In accordance with the process aspect of the present invention there is provided an improved batch process for pyrolysis of tires which in its broadest aspects comprises the steps of: a) baling a plurality of tires in compressed cylinder while retaining an opening extending axially therethrough; b) placing the compressed cylinder in a batch type pyrolysis oven in such a manner that heat can flow through the orifice upon pyrolysis; and pyrolyzing the compressed cylinder for extracting useful by-products.

In accordance with the process aspects the bale 82 as prepared above is placed in a suitable oxygen purged canister 84. The canister 84 includes a valve member 86 which is in communication with the canister 84 and allows, connection to pipe member 88. A water cooled sleeve 90 surrounds the pipe 88. A collection tank 92 is provided for collection of distillation products in liquid form. A heat source 96 is provided for heating of the canister 84 to provide the heat for pyrolysis of the bale of tires 82.

Figure 6:
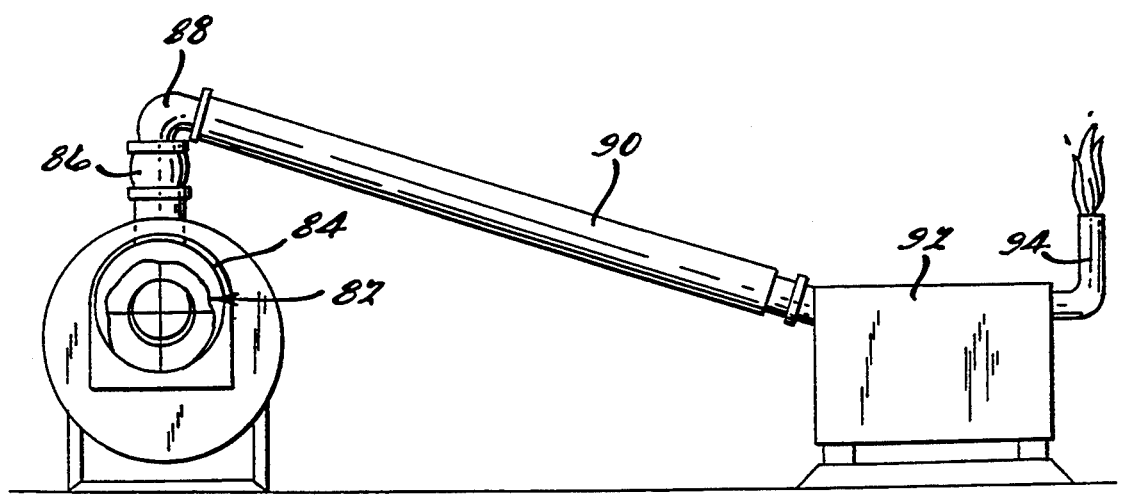
FIG. 6 is a front view of the distillation apparatus in accordance with the method of the present invention.

Thus, in operation the tires are heated to gasify the distillation products from the destructive distillation of the tire bale 82. Upon reaching a proper temperature of about 200° F. The valve 86 may be opened allowing the gases to flow through the pipe 88 which is thereafter condensed via the water cooled sleeve 90 such that the liquid products collect in the tank 92. Any products which are not collected in liquid form may be collected from riser pipe 94 or burned off as illustrated in FIG. 6.

After completion of the pyrolysis process the char material can be recovered from canister 84. Because there is no disruption of the tires during the pyrolysis there is a net increase in char recovery over a screw type pyrolysis process. Also, less char is released along with the pyrolysis gases because of the lack of agitation of the char. This results in an increase in the purity of the resultant distillate by-products.

Therefore, provided in the present invention is simple inexpensive pyrolysis process and apparatus which reduces contamination of distillation by-products and increases the recovery of char materials. It will be readily appreciated by those skilled in the art that the process of the present invention can be accomplished via relatively inexpensive small scale equipment and therefore would be advantageous over the large processing centers which have been associated with pyrolysis processes of the past. Great costs savings are achieved because no shredding of the tires is necessary.

Additionally, the inventor has found that the tire bale configuration provides rapid degradation of the tires because it allows rapid heat up due to the circulation of heat inside the center of the tire bale. Thus, in the present invention there are no internal "cold" spots which would detrimentally affect or unduly lengthen the process, which were problems with prior art batch type processes.

Figure 7:
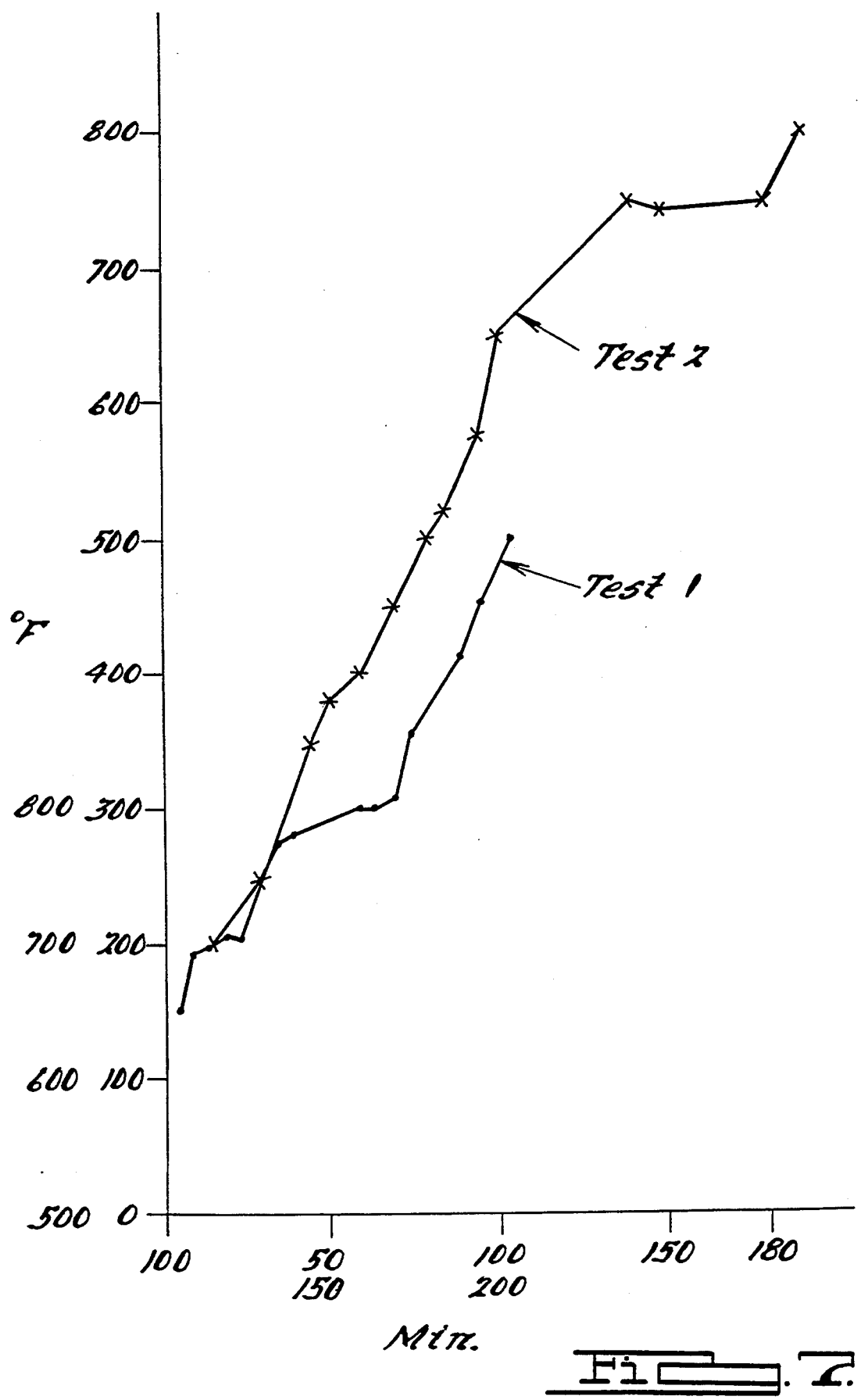
FIG. 7 is a graph depicting the distillation curve of a typical pyrolysis process in accordance with the method of the present invention.

Illustrated in FIG. 7 is an example of a distillation curve from a process conducted in accordance with the teachings of the present invention as disclosed below. The details of the process are set forth below in Examples I and II, which are set forth herein for purpose of further understanding of the present invention rather than limitative.

EXAMPLE I

A pair of tires were loosely bound together to form a bundle. The tires were placed in a cylinder which was thereafter evacuated to remove oxygen. The cylinder includes a valved duct work for evacuation and thereafter release of gaseous pyrolysis products. The evacuated cylinder was placed in a larger gas fired oven and the duct work was connected to a distillation pipe with a water filled jacket. The other end of the distillation pipe was connected on a collection tank which included a vent tube. The oven was heated to a suitable temperature of about 200° F. After approximately 24 minutes the valve was opened. The oven was heated for a twelve hour period for 15 minutes each, a temperature reading was taken from the valve portion. This data is set forth in Table I below.

TABLE I

| Elapsed Time | Temperature | Pressure | Comments |
|---|---|---|---|
| 0 min. | on | 3 | |
| 5 min. | 150° F. | 5 | |
| 10 min. | 195° F. | 5 | |
| 15 min. | 200° F. | 5 | |
| 17 min. | 205° F. | 7 | |
| 20 min. | 205° F. | 7 | |
| 24 min. | 200° F. | 10 | valve opened |
| 30 min. | 250° F. | 15 | |
| 35 min. | 275° F. | 15 | |
| 40 min. | 280° F. | | |
| 60 min. | 300° F. | 5 | |
| 65 min. | 300° F. | | |
| 70 min. | 305° F. | 7 | |
| 73 min. | 350° F. | 7 | |
| 75 min. | 360° F. | 7 | |
| 90 min. | 410° F. | 7 | |
| 95 min. | 460° F. | 7 | |
| 105 min. | 500° F. | | |
| 110 min. | 500° | | |

These results were graphed as shown in FIG. 7, labeled Test I.

Thus, it can be seen by the figure that the tires pyrolize relatively quickly in the present invention without temperature fluctuations. The pyrolysis oils collected from such a process are extremely clean. This indicates that very little soot is carried over into the gaseous stream.

EXAMPLE II

Utilizing the apparatus disclosed herein a 43 tire bale was compressed and secured. The tires were placed in a cylinder which was thereafter evacuated to remove oxygen. The cylinder includes a valved duct work for evacuation and thereafter release of gaseous pyrolysis products. The evacuated cylinder was placed in a larger gas fired oven and the duct work was connected to a distillation pipe with a water filled jacket. The other end distillation tube was connected on a collection tank which included a vent tube. The oven was heated to a suitable temperature of about 200°. After approximately 15 minutes the valve was opened. The oven was heated for approximately 8 hours. A temperature reading was taken from the valve portion. This data is set forth in Table II below.

TABLE II

| Elapsed Time | Temperature | Comments |
|---|---|---|
| 0 | | Start up 90° F. |
| 15 | 200 | |
| 30 | 290 | |
| 45 | 340 | |
| 60 | 390 | |
| 75 | 410 | |
| 90 | 480 | |
| 105 | 580 | |
| 125 | 625 | |
| 140 | 650 | Started flare |
| 155 | 700 | |
| 165 | 750 | |
| 180 | 775 | |
| 195 | 790 | |
| 210 | 800 | |
| 225 | 800 | |
| 240 | 810 | |
| 253 | 840 | |
| 270 | 840 | |
| 285 | 860 | |
| 300 | 850 | |
| 315 | 840 | |
| 330 | 850 | |
| 345 | 860 | |
| 360 | 850 | Flare off |
| 375 | 860 | |
| 390 | 840 | |
| 400 | 800 | |
| 405 | 810 | |
| 420 | 850 | |
| 435 | 850 | |
| 450 | 860 | |
| 480 | 850 | |
| 495 | 825 | Took off insulation jacket |
| 510 | 825 | |
| 520 | 700 | Turned off power/ |
| 525 | 500 | opened furnace doors |
| 540 | 480 | |
| 555 | 250 | |

From the approximate 800 pound bale of tires approximately 43 gallons of very clean pyrolysis oil was obtained and approximately 377 pounds of char was obtained. Additionally, the gas flared off an amount to about fifty pounds.

What is claimed is:

1. An apparatus for batch compression of tires, comprising:
   support means for supporting a radially exterior bottom portion of a plurality of tires in a generally axially aligned position, said support means being mounted to a frame;
   aligning means for securing said plurality of tires in said axially aligned position, including an aligning member extending in an axial direction;
   a pivotal member coupled with said frame so as to pivot about an axis parallel to and displaced from said axis, said aligning-member being affixed to said pivotal member, whereby said aligning member may be moved away from said support position, to allow said tires to be easily placed on said support means; and
   compressing means for axially compressing said tires and including an axially elongated protrusion for extending within a central orifice of each of the tires, said aligning member adapted to be disposed in a support position proximate to a radially exterior side portion of said tires, wherein said aligning means and said protrusion resist disalignment of said tires when said compressing means compresses said tires, said compressing means being mounted on the frame.

2. The apparatus of claim 1 wherein said aligning means is adjustable, so that said aligning member may be moved away from said support position, to allow said tires to be placed on said support means in a direction perpendicular to said axis before comprising said tires.

3. The apparatus of claim 1 wherein said aligning means further comprises a second aligning member extending along an axial direction for supporting a radially exterior top portion of said tires.

4. The apparatus of claim 1, further comprising powered means for moving said pivotal member.

* * * * *

UNITED STATES PATENT AND TRADEMARK OFFICE
CERTIFICATE OF CORRECTION

PATENT NO. : 5,427,022
DATED : June 27, 1995
INVENTOR(S) : Donald M. Gardner

It is certified that error appears in the above-indentified patent and that said Letters Patent is hereby corrected as shown below:

Column 1, Line 6, "Thee" should be --The--.

Column 1, Line 25, "the" should be --type--, first occurrence.

Column 1, Line 28, "the" should be --type--, second occurrence.

Column 1, Line 60, "byproducts" should be --by-products--.

Column 2, Line 50, "bailer" should be --baler--.

Column 3, Line 53, "membrane" should be --members--.

Column 4, Line 20, delete "," after "allows".

Column 6, Line 45, delete "-" after "aligning".

Column 6, Line 63, "comprising" should be --compressing--.

Signed and Sealed this

Sixteenth Day of January, 1996

Attest:

BRUCE LEHMAN

Attesting Officer         Commissioner of Patents and Trademarks